United States Patent [19]

Gruber et al.

[11] E Patent Number: Re. 33,172

[45] Reissued Date of Patent: Feb. 27, 1990

[54] PROCESS FOR MAGNETIC IMAGE CHARACTER RECOGNITION

[75] Inventors: Robert J. Gruber, Pittsford; John F. Knapp, Fairport; Steven B. Bolte, Rochester, all of N.Y.

[73] Assignee: Xerox Corporation, Stamford, Conn.

[21] Appl. No.: 45,346

[22] Filed: May 4, 1987

Related U.S. Patent Documents

Reissue of:

[64] Patent No.: 4,517,268
Issued: May 14, 1985
Appl. No.: 531,520
Filed: Sep. 12, 1983

[51] Int. Cl.[4] ..... G03G 9/02

[52] U.S. Cl. ..... 430/39; 430/108; 430/106.6; 430/126

[58] Field of Search ..... 430/39, 106.6, 108, 430/110, 126

[56] References Cited

U.S. PATENT DOCUMENTS

| | | | |
|---|---|---|---|
| 3,052,564 | 9/1962 | Kulesza | 117/17.5 |
| 3,593,913 | 7/1971 | Bremer | 229/72 |
| 3,627,682 | 12/1971 | Hall | 430/106.6 |
| 3,803,634 | 4/1974 | Namikawa | 346/74 MP |
| 3,955,295 | 5/1976 | Mayer | 40/2.2 |
| 3,998,160 | 12/1976 | Pearce | 101/426 |
| 4,060,711 | 11/1977 | Buros | 235/488 |
| 4,114,032 | 9/1978 | Brosow et al. | 235/493 |
| 4,128,202 | 12/1978 | Buros | 235/493 |
| 4,234,214 | 11/1980 | Lee | 283/57 |
| 4,391,890 | 7/1983 | Lu | 430/110 |

OTHER PUBLICATIONS

Anser Co. Bulletin, Jun. 1, 1983.

*Primary Examiner*—John L. Goodrow
*Attorney, Agent, or Firm*—E. O. Palazzo

[57] ABSTRACT

Disclosed is an improved, simple, economical process for generating documents, such as personal checks, suitable for magnetic image character recognition, which process comprises generating such documents with conventional xerographic methods in a high speed electronic laser printing device, and wherein there is selected as the developer composition a magnetic toner containing from about 20 percent by weight to about 70 percent by weight of magnetite particles, and from about 30 percent by weight to about 80 percent by weight of toner resin particles of styrene copolymers, such as a styrene butadiene copolymer, a styrene n-butylmethacrylate copolymer, or polyesters, and wherein the carrier particles are comprised of ferrite cores, coated with various polymeric resinous compositions. There can also be included in the developer composition various additives such as collodial silica particles, and charge enhancing additives, and further conductive carbon black or insulating carbon black particles can be incorporated into the carrier polymeric resinous coating.

31 Claims, No Drawings

PROCESS FOR MAGNETIC IMAGE CHARACTER RECOGNITION

Matter enclosed in heavy brackets [ ] appears in the original patent but forms no part of this reissue specification; matter printed in italics indicates the additions made by reissue.

BACKGROUND OF THE INVENTION

The present invention relates generally to processes for generating documents, and more specifically the present invention is directed to electrostatographic processes for generating documents suitable for magnetic image character recognition, which processes involve the use of certain magnetic toner compositions. In one important embodiment of the present invention, personal checks can be prepared and printed in a very simple and economical manner by conventional xerography with certain magnetic dry toner compositions. In a further aspect of the present invention, the entire personal check document can be printed with known duplicator devices, including those containing lasers therein such as the commercially available Xerox Corportion 9700 ® printing machine.

*The formation and development of images on the surface of photoconductive materials by electrostatic means is well known. The basic xerographic process, as taught by C. F. Carlson in U.S. Pat. No. 2,297,691, involves placing a uniform electrostatic charge on a photoconductive insulating layer, exposing the layer to a light and shadow image to dissipate the charge on the areas of the layer exposed to the light and developing the resulting latent electrostatic image by depositing on the image a finely - divided electroscopic material referred to in the art as "toner". The toner will normally be attracted to those areas of the layer which retain a charge, thereby forming a toner image corresponding to the latent electrostatic image. This powder image may then be transferred to a support surface such as paper. The transferred image may subsequently be permanently affixed to the support surface as by heat. Instead of latent image formation by uniformly charging the photoconductive layer and then exposing the layer to a light and shadow image, one may form the latent image by directly charging the layer in image configuration. Thereafter, the powder image may be fixed to the photoconductive layer is elimination of the powder image transfer step is desired. Other suitable fixing means such as solvent or overcoating treatment may be substituted for the foregoing heat fixing step.*

Magnetic ink printing methods with inks containing magnetic particles are known. For example, there is disclosed in U.S. Pat. No. 3,998,160 that various magnetic inks have been used in printing digits, characters, or artistic designs, on checks or bank notes. The magnetic ink used for these processes consists of acicular magnetic particles, such as magnetite in a fluid medium, and a magnetic coating of ferric oxide, chromium dioxide, or similar materials dispersed in a vehicle comprising binders, and plasticizers, according to the disclosure of the '160 patent. It is further disclosed in this patent that there is provided a method of printing on a surface with an ink including acicular magnetic particles in order that the authenticity of the printing can be verified, wherein a pattern is formed on a carrier with the ink in the wet state, and wherein the particles are subjected to a magnetic aligning process while the ink is on the carrier. Subsequently, the wet ink is transferred to the surface, which transfer is accomplished with substantially aligned particles according to the teachings of this patent.

British Pat. No. 1,183,479 discloses a method of orienting magnetic particles in a liquid prior to the deposition of the liquid on a tape media, while British Pat. No. 1,331,604 relates to the recording of information, especially security information, onto cards having magnetic layers thereon. The cards according to the '604 patent, are provided with a magnetic water mark by orienting preselected areas of a coating consisting of acicular magnetic particles in a binder, while the coating is in a liquid state, followed by causing the coating to solidify.

Disclosed in U.S. Pat. No. 4,128,202 is a device for transporting a document that has been mutilated or erroneously encoded wherein there is provided a predetermined area for the receipt of correctly encoded magnetic image character recognition information (MICR). As indicated in this patent, the information involved is referred to as MICR characters, which characters appear, for example, at the bottom of personal checks as printed numbers and symbols. These checks have been printed in an ink containing magnetizable particles therein, and when the information contained on the document is to be read, the document is passed through a sorter/reader which first magnetizes the magnetizable particles, and subsequently detects a magnetic field of the symbols resulting from the magnetic retentivity of the ink. The characters and symbols involved, according to the '202 patent are generally segregated into three separate field, the first field being termed a transient field, which contains the appropriate symbols and characters to identify the bank, bank branch, or the issuing source. The second field contains the account affected by the transactions, and the third field, which cannot be pre-recorded indicates the amount of the check. Typically, the first two fields are preencoded, that is they can be placed on the check document prior to the bank or issuing source sending the checks to the customer for use. However, after the check has been presented to the bank for payment, and is processed through various data processing systems, the amount of the check must be encoded at the appropriate location, this latter step being referred to as post encoding. Post encoding is typically accomplished with special encoding machines having a keyboard operated by an individual who generally observes the amount written on the check, and encodes the amount in MICR characters in the amount field of a clear band for example.

Additional, there is disclosed in an Anser Company Bulletin, published about June 1, 1983, a printer for checks and forms based on ion deposition imaging. According to the description contained in this publication, the Anser I printing technology allows for the printing of checks by generating a cloud of free ions in a charging chamber by means of a high frequency electric field, and subsequently introducing a second field for the purpose of accelerating a small portion of these ions through a very small hole into the dielectric surface of an imaging cylinder. Development is then apparently accomplished by applying toner to the charged image, followed by transfer and fixing to a substrate such as paper. Apparently, fixing is accomplished by cold pressure fusing, thus single component toner particles are selected.

While the prior art processes are suitable for their intended purposes, there remains a need for simple, economical processes for generating documents. More specifically, there remains a need for generating documents suitable for magnetic image character recognitions wherein the documents involved can be entirely printed in one step thereby eliminating the need to stock numerous different document blanks. Moreover, there continues to be a need for improved processes which will print entire documents, such as personal checks and wherein the format design and customer information contained on the check, such as name, address, and check numbers, can be simply and rapidly modified. There also remains a need for improved processes for generating documents, especially personal checks, suitable for magnetic image character recognition, which process utilizes conventional, simple known electrostatographic imaging methods, and wherein there is selected certain magnetic dry toner compositions.

SUMMARY OF THE INVENTION

It is an object of the present invention to provide improved processes for generating documents which overcome the above noted disadvantages.

In a further object of the present invention there are provided improved processes for generating documents suitable for magnetic image character recognition.

In a further object of the present invention there are provided improved simple, economical processes for generating personal checks.

In yet a further object of the present invention there are provided improved, economical, simple processes for generating personal checks for magnetic image character recognition.

Another object of the present invention resides in the provision of improved processes for generating documents, including personal checks, which will be suitable for magnetic image character recognition, which process involves conventional electrostatographic methods, wherein certain magnetic dry toners are selected.

In still a further object of the present invention there are provided improved processes wherein documents suitable for magnetic image character recognition are generated by high speed electronic printing electrostatographic devices, containing suitably selected laser devices.

These and other objects of the present invention are accomplished by the provision of improved processes for generating documents suitable for magnetic image character recognition. More specifically, the process of the present invention in one embodiment involves the generation of documents, including personal checks, which documents are suitable for magnetic image character recognition and wherein conventional electrostatographic methods are selected. This process comprises providing a document, imprinting characters on this document with conventional electrostatographic methods, which characters are preselected as desired and stored in the printing device used, and wherein a magnetic toner composition containing from about 20 percent by weight to about 70 percent by weight of various magnetites, and 30 to 80 percent of certain toner resin particles are selected.

In one embodiment of the present invention there is thus provided an improved process for generating documents which comprises providing the document desired, imprinting characters thereon by electrostatographic methods with a high speed electronic printing device, and developing the characters with a magnetic developer composition comprised of from about 20 percent by weight, to about 70 percent by weight of magnetite, and from about 30 percent by weight, to about 80 percent by weight of toner resin particles, containing styrene copolymers, such as styrene butadiene copolymers, or styrene butylmethacrylate copolymers, styrene acrylate copolymers or polyesters, and carrier particles comprised of ferrite cores coated with polymeric compositions.

Accordingly, there is provided in accordance with the present invention an improved process for generating documents which comprises providing the document desired, imprinting characters thereon by known electrostatographic methods, particularly xerographic methods, with a high speed electronic printing device, such as those commercially available from Xerox Corporation as the 9700® Printer, and developing the characters with a magnetic developer composition comprised of from about 20 percent by weight to about 70 percent by weight of magnetite particles, and from about 30 percent by weight to about 80 percent by weight of toner resin particles selected from the group consisting of styrene methacrylate copolymers, styrene butdiene copolymers, styrene acrylate copolymers, and polyesters, and carrier particles comprised of ferrite cores coated with polymeric compositions.

The process of the present invention has several advantages over many prior art processes, for example, the document, such as personal checks are generated by conventional xerography and further the entire document can be printed, in contrast to many prior art methods wherein the document is printed in a number of sequential steps. Additionally the specific two component developer composition selected provides images of excellent resolution.

By electrostatographic imaging methods in accordance with the present invention is meant those processes, including xerographic processes, where images or characters are generated on suitable substrates, including checks, which images are developed with the magnetic toner compositions disclosed hereinafter and wherein the images are permanently affixed thereto by suitable fixing means such as heat. In one important embodiment of the present invention the image characters are generated on paper used for personal checks, in high speed electronic printing devices, such as those commercially available from Xerox Corporation as the 8700®, and 9700® printer, and other similar devices.

Examples of magnetic toner compositions useful in the process of the present invention include those containing from about 20 percent by weight to about 70 percent by weight of magnetite, such as commercially available acicular magnetites, and commercially available cubically shaped magnetites. Preferred magnetites useful in the toner composition of the present invention are acicular magnetites commercially available from Pfizer as MO4431 and MO 4232, cubical magnetites, MO 7029, commercially available from Pfizer Corporation, and Mapico Black, commercially available from Cities Services Company. Other useful magnetites include polyhedral magnetites, available from Hercules Incorporation as EX 1601, and XMT 100.

The toner compositions also contains from about 30 percent by weight to about 80 percent by weight of polyester or polystyrene resinous particles, such as styrene butadiene resins, commercially available as Pliolite, styrene butylmethacrylate copolymer resins, styrene acrylate copolymers, such as styrene butylacrylate copolymer resins, and the like. Particularly preferred are toner resin particles containing from about 55 percent by weight of styrene to about 80 percent by weight of styrene, and from about 20 percent by weight of n-butylmethacrylate to about 45 percent by weight of n-butylmethacrylate, or styrene butadiene resins containing from about 85 percent by weight to about 95 percent by weight of styrene, and from about 5 percent by weight to about 15 percent by weight of butadiene.

There can also be incorporated into the magnetic toner composition of the present invention carbon black particles, in an amount of from about 0.1 percent by weight to about 10 percent by weight, and from about 0.3 percent by weight to about 0.7 percent by weight of collodial silica particles, such as commercially available Aerosils. These additives which are optional ingredients are added for a number of purposes, thus for example carbon black particles are added primarily for the purpose of imparting a deep black color to the toner resin particles. Also it is believed that the addition of carbon black particles favorably affects the triboelectric charging properties of the toner particles. The silica particles are added for the primary purpose of improving the flow of the toner resin particles, improving blade cleaning of the photoresponsive imaging surface, reducing the toner blocking temperature, and assisting in the charging of the toner particles.

Also in accordance with a further variation of the process of the present invention, the magnetic toner composition selected can contain mixtures of acicular and cubic magnetites, that is, a mixture of hard magnetite and soft magnetite blends, Generally, from about 20 percent to about 30 percent by weight of the hard magnetic substance is selected, and from about 10 percent by weight to about 30 percent by weight of a soft magnetic substance, such as Mapico Black, is selected. Moreover, there can be incorporated into the toner composition various highly colored pigments, from about 2 percent by weight to about 10 percent by weight, such as red pigments, green pigments, blue pigments, or mixtures thereof.

The toner composition of the present invention is formulated into a developer by admixing therewith carrier particles comprised of ferrite or steel cores coated with various polymers including terpolymers of styrene, methylmethacrylate, and a silane. The type of ferrite cores selected are as described in U.S. Pat. No. 3,914,181 the disclosure of which is totally incorporated herein by reference, while the terpolymer coatings are described in U.S. Pat. Nos. 3,467,634; 3,627,522; and 3,526,533, the disclosure of each of these patents being totally incorporated herein by reference. One specific preferred carrier composition is comprised of Toniolo steel or a ferrite core, containing zinc, iron and nickel with a coating on its entire surface of a sytrene methylmethacrylate, triethoxysilane terpolymer. Another preferred carrier particle selected for the developing composition of the present invention is comprised of a ferrite powder core, reference U.S. Pat. No. 3,914,181, containing a coating thereover of a methylmethyacrylate, styrene, vinyl triethoxy silane terpolymer, or reclaimed ferrite powder coated with a terpolymer of methylmethacrylate, styrene, and vinyl triethoxy silane, which terpolymer contains about 85 percent by weight of methylmethacrylate, about 15 percent by weight of styrene, and about 5 percent by weight of the silane.

The carrier particles are generally of a diameter of from about 30 microns to about 200 microns, and preferably have a diameter of from about 75 microns to about 125 microns. These carrier particles are generally mixed with the toner particles so as to result in a toner concentration of from about 1 percent to about 3 percent.

Additionally useful as carrier particles are uncoated ferrite substances, and coated ferrite substances wherein the coating contains therein conductive or non-conductive carbon black particles. Accordingly, there results carrier particles wherein the conductivity is from about $10^{-5}$ (ohm-cm)$^{-1}$ to about $10^{-9}$ (ohm-cm)$^{-1}$, or nonconductive carrier particles wherein the conductivity thereof is from about $10^{-11}$ (ohm-cm)$^{-1}$ to about $10^{-17}$ (ohm-cm)$^{-1}$, that is these carrier particles possess insulating characteristics. Specific examples of conductive carbon black compositions that may be selected for incorporation into the carrier particles include those commercially available as Vulcan XC72, obtained from Cabot Corporation, while nonconductive carbon black compositions used include those prepared from commercially available Regal 330 carbon black particles. Generally, the carbon black particles are present in the carrier coating in an amount of from about 5 percent by weight to about 30 percent by weight, and preferably are present in an amount of from about 15 percent by weight to about 20 percent by weight.

Various photoconductive imaging members can be selected for incorporation into the printing devices used, including for example, amorphous selenium, amorphous selenium alloys, such as selenium tellurium, selenium arsenic, selenium tellurium arsenic, halogen doped amorphous selenium compositions, and halogen doped amorphous selenium alloys, as well as layered photoresponsive imaging methods containing photogenerating substances, and transport molecules. Examples of layered photoresponsive devices include those as described in U.S. Pat. No. 4,225,990, the disclosure of which is totally incorporated herein by reference. Specific examples of photogenerating substances that may be selected include metal phthalocyanines, metal free phthalocyanines, trigonal selenium, vanadyl phthalocyanine and the like, while examples of transport molecules include the diamine compositions as disclosed in the '990 patent. Generally, the photogenerating pigment, and the amine transport molecules are dispersed in inactive resinous binder compositions, such as polyvinyl carbazole, polycarbonates, and the like. A preferred photoconductive imaging member selected for the printing device is comprised of a selenium arsenic alloy, containing from about 90 percent by weight to about 99.9 percent by weight of selenium, and from about 10 percent by weight to about 0.1 percent by weight of arsenic.

One significant advantage in selecting non-impact type printers for generating the MICR codes for the documents being created in accordance with the process of the present invention resides in the flexibility in varying the contents of the fields involved. Also in non-impact printing the infrequently varying codes, such as the bank sorting codes, the individual account codes, and the check number codes are stored in a computerized memory for example. Printing of the MICR codes on a non-impact printer, such as the Xerox Corporation 9700® printing device is accomplished by replacing the developer composition usually selected with the magnetic dry ink developer composition described hereinbefore. Personal checks with varying formats can then be generated utilizing fonts available to the user. When using these fonts it is important that the MICR lines and the associate clear bands are closely scrutinized in order that one will achieve the desired results. For example, the MICR codes must conform to exacting specifications relative to character dimensionability and integrity, and character and field positioning relative to the edges of the documents, and in this regard MICR fonts have been generated which will provide printed characters corresponding to the MICR specifications in non-impact printers. Positioning of the MICR line is readily achieved by use of standard printing software, which software is commercially available, from Xerox Corporation, as the Xerox FDL for the 9700® printer devices. This software permits the user to generate checks of a highly flexible format in appearance containing appropriate MICR encoding lines of a variable content in an efficient and economical manner. Moreover, the effect of run lengths on efficiency is minimal and the user needs no pre-printed forms containing MICR printing codes.

Additionally, the magnetic signal level is of substantial importance in magnetic image character recognition information systems since the amount of toner composition which is deposited on the document being generated will vary in proportion to the signal level. Thus, for example, at a signal level of from about 50 percent to 200 percent of nominal, value of 100 percent and preferably at a signal value of from about 80 percent to about 100 percent of nominal, there is deposited on the generated document, such as personal checks, desirable effective amounts of the toner particles of the present invention.

The following specific examples are now being provided to illustrate preferred embodiments of the present invention, however, it is not intended to be limited to the process parameters disclosed. In these examples parts and percentages are by weight unless otherwise indicated.

EXAMPLE I

There was prepared a toner composition by melt blending in a Banbury apparatus, followed by mechanical attrition, which composition contains 67.5 percent by weight of a styrene butadiene copolymer, containing 90 percent by weight of styrene, and 10 percent by weight of butadiene, available from Goodyear Chemical Corporation, as Pliolite, and 32.5 percent of acicular magnetite particles, available from Pfizer Corporation, as magnetite MO4232. Micronization is accomplished for the resulting toner particles so as to obtain paricles with a volume average of 10 to 12 microns. Subsequently there is added to the resulting composition by blending with a Lodige blender, 0.3 percent of Aerosil 972, particles.

A developer composition was then prepared by blending together in a twin cone blender for about 9 minutes, 3 percent by weight of the aboveprepared toner composition, and 97 percent by weight of carrier particles consisting of a ferrite carrier core coated with a terpolymer of methylmethacrylate, styrene, and triethoxy silane. (85/15/5).

EXAMPLE II

A second developer composition was prepared by blending together 3 percent by weight of the toner composition as prepared in Example I, and 97 percent by weight of carrier particles containing a ferrite core coated with 0.6 percent by weight of a polymer coating consisting of 20 weight percent of Vulcan XC72R carbon black, available from Pfizer Corporation, and 80 percent by weight of a terpolymer of methylmethacrylate, styrene, and triethoxy silane. (85/15/5) The measured carrier conductivity at 200 volts per millimeter was $5\times10^{-9}$ (ohm-cm)$^{-1}$.

EXAMPLE III

A toner composition was prepared by repeating the procedure of Example I, with the exception that there was selected 65 percent by weight of the styrene butadiene copolymer resin, 32.5 percent by weight of acicular magnetic particles, available from Pfizer, as MO4232, and 2.5 percent by weight of Regal 330 carbon black commercially available from Cabot Corporation. Subsequently there was added to the resulting toner composition in a Lodige blender, 0.3 percent by weight of Aerosil.

A developer composition was then prepared by blending together in a twin cone blender for 9 minutes, 3 percent by weight of the above-prepared toner composition, and 97 percent by weight of carrier particles consisting of a ferrite ore coated with a terpolymer of styrene, methylmethacrylate, and triethoxy silane. (85/15/5).

A second developer composition was prepared by blending together in a twin cone blender, 3 percent by weight of the above-prepared toner composition, and 97 percent by weight of carrier particles consisting of a ferrite core, with 0.6 weight percent of a polymer coating containing 20 percent by weight of Vulcan XC72R carbon black available from Pfizer, and 80 percent by weight of the terpolymer of styrene, methylmethacrylate, and triethoxy silane.

EXAMPLE IV

A toner composition was prepared by repeating the procedure of Example I with the exception that there was selected as the toner resin particles in place of the styrene butadiene copolymer, a styrene n-butylmethacrylate copolymer containing about 58 percent by weight of styrene and 42 percent by weight of n-butylmethacrylate. A developer composition was then prepared by repeating the procedure of Example I.

Other toner and developer compositions are prepared by repeating the procedures of Examples I–IV with the exception that there was selected as the toner composition, 70 percent by weight of a styrene butadiene copolymer, 30 percent by weight of acicular magnetic particles, available form Pfizer as MO4431, and 0.3 percent by weight of Aerosil: 60 percent by weight of a polyester resin, 40 percent by weight of acicular magnetic particles, available from Pfizer as MO4431, and 0.5 percent by weight of Aerosil; 40 percent by weight of a styrene butadiene copolymer, 60 percent by weight of acicular magnetic particles commercially available as Mapico Black, and 0.3 percent by weight of Aerosil.

The developer compositions as prepared in Examples I–IV were incorporated into the Xerox Corporation 9700® laser printer wherein the photoconductive imaging member is a selenium arsenic alloy, and there resulted useful personal check documents, over 100,000 in number, of high resolution.

As a further optional component there can be included in the toner compositions of the present invention various charge enhancing additives, such as alkyl pyridinium halides preferably cetyl pyridinium chloride, reference U.S. Pat. No. 4,298,672, the disclosure of which is totally incorporated herein by reference, and various sulfates and sulfonates, such as stearyl dimethyl phenethyl ammonium para-toluene sulfonate, reference U.S. Pat. No. 4,338,390, the disclosure of which is totally incorporated herein by reference. Generally from about 1 percent to about 10 percent by weight of charge enhancing additive is incorporated into the toner composition. This additive assists in imparting a positive charge to the toner resin particles.

Other modifications of the present invention may occur to those skilled in the art based upon a reading of the present disclosure and these are intended to be included within the scope of the present invention.

We claim:

1. An improved process for generating documents which comprises providing the document desired, imprinting characters thereon by electrostatographic methods with a high speed electronic printing device, and developing the characters with a magnetic developer composition comprised of from about 20 percent by weight to about 70 percent by weight of magnetite, and from about 30 percent by weight to about 80 percent by weight of toner resin particles, selected from the group consisting of styrene methacrylate copolymers, styrene butadiene copolymers, and styrene acrylate copolymers; and carrier particles comprised of ferrite cores coated with polymeric compositions.

2. A process in accordance with claim 1 wherein the documents generated are personal checks.

3. A process in accordance with claim 1 wherein the magnetite is present in an amount of from about 20 percent by weight to about 50 percent by weight and the toner resin particles are present in an amount of from about 50 percent by weight to about 80 percent by weight.

4. A process in accordance with claim 1 wherein the toner resin particles are comprised of a styrene butadiene copolymer, containing from about 85 percent to about 90 percent of styrene, and from about 10 percent to about 15 percent by weight of butadiene, or a styrene n-butylmethacrylate resin particle, wherein the styrene is present in an amount of from about 40 percent by weight to about 90 percent by weight, and the n-butylmethacrylate is present in an amount of from about 10 percent by weight to about 60 percent by weight.

5. A process in accordance with claim 1 wherein there is further included in the polymeric coating for the carrier particles conductive carbon black or insulating carbon black particles.

6. A process in accordance with claim 1 wherein there is further included in the toner resin particles carbon black particles, or collidal silica particles.

7. A process in accordance with claim 1 wherein the polymeric coating composition for the ferrite core is a methacrylate, styrene, vinyl triethoxy silane terpolymer.

8. A process in accordance with claim 1 wherein the magnetite is comprised of acicular magnetite.

9. A process in accordance with claim 1 wherein there is further incorporated into the toner composition as a charge enhancing additive stearyl dimethyl phenethyl ammonium para-toluene sulfonate.

10. A process in accordance with claim 1 wherein there is added to the toner composition alkyl pyridinium charge enhancing additives.

11. A process in accordance with claim 10 wherein the additive is cetyl pyridinium chloride.

12. A process in accordance with claim 1 wherein the magnetite is cubical magnetite.

*13. An improved process for generating documents which comprises providing the document desired, imprinting characters thereon by electrostatographic methods with a high speed electronic printing device, and developing the characters with a magnetic developer composition comprised of from about 20 percent by weight to about 70 percent by weight of magnetite, and from about 30 percent by weight to about 80 percent by weight of toner resin particles selected from the group consisting of styrene methacrylate copolymers, styrene butadiene copolymers, and styrene acrylate copolymers; and carrier particles.*

*14. A process in accordance with claim 13 wherein the carrier particles consist of a core with a polymeric coating thereover.*

*15. A process in accordance with claim 14 wherein there is selected as the core a component selected from the group consisting of steel, iron, nickel and ferrites.*

*16. A process in accordance with claim 14 wherein the polymeric coating is a terpolymer of styrene, methylmethacrylate, and an organo silane.*

*17. A process in accordance with claim 14 wherein the polymeric coating for the carrier particles includes conductive carbon black or insulating carbon black particles.*

*18. A process in accordance with claim 15 wherein the coating includes conductive carbon black or insulating carbon black particles.*

*19. An improved aerographic process which comprises forming a latent image on an imaging member; thereafter developing this image with a magnetic developer composition comprised of from about 20 percent to about 70 percent by weight of magnetite, and from about 30 percent by weight to about 80 percent by weight of toner resin particles selected from the group consisting of styrene methacrylate copolymers, styrene butadiene copolymers and styrene acrylate copolymers, and polyesters; and carrier particles; subsequently transferring the developed image to a supporting substrate; and affixing the image thereto.*

*20. A process in accordance with claim 19 wherein the carrier particles are comprised of a core selected from the group consisting of iron, nickel and ferrites.*

*21. A process in accordance with claim 19 wherein the carrier particles include a polymeric coating.*

*22. A process in accordance with claim 21 wherein the coating is a styrene methacrylate organo silane terpolymer.*

*23. A process in accordance with claim 21 wherein there is included in the polymeric coating conductive carbon black or insulating carbon black particles.*

*24. A process in accordance with claim 19 wherein there are further included in the toner composition charge enhancing additives selected from the group consisting of stearyl dimethyl phenethyl ammonium paratoluene sulfonate, and alkyl pyridinium halides.*

*25. A process in accordance with claim 19 wherein the supporting substrates are personal checks.*

*26. A process in accordance with claim 19 wherein the latent image is formulated by a high speed electronic printing device.*

*27. A process in accordance with claim 19 wherein the magnetite is present in an amount of from about 20 percent by weight to about 50 percent by weight, and the toner resin particles are present in an amount of from about 50 percent by weight to about 80 percent by weight.*

*28. A process in accordance with claim 19 wherein the toner resin particles are comprised of a styrene butadiene copolymer containing from about 85 percent to about 90 percent of styrene, and from about 10 percent to about 15 percent by weight of butadiene, or a styrene n-butylmethacrylate resin particle, wherein the styrene is present in an amount of from about 40 percent by weight to about 90 percent by weight, and the n-butylmethacrylate is present*

*in an amount of from about 10 percent by weight to about 60 percent by weight.*

*29. A process in accordance with claim 19 wherein there are further included in the developer colloidal silica particles.*

*30. A process in accordance with claim 19 wherein the imaging member is comprised of a component selected from the group consisting of selenium and selenium alloys.*

*31. A process in accordance with claim 19 wherein the images are permanently affixed by heat.*

* * * * *